United States Patent Office 2,950,133
Patented Aug. 23, 1960

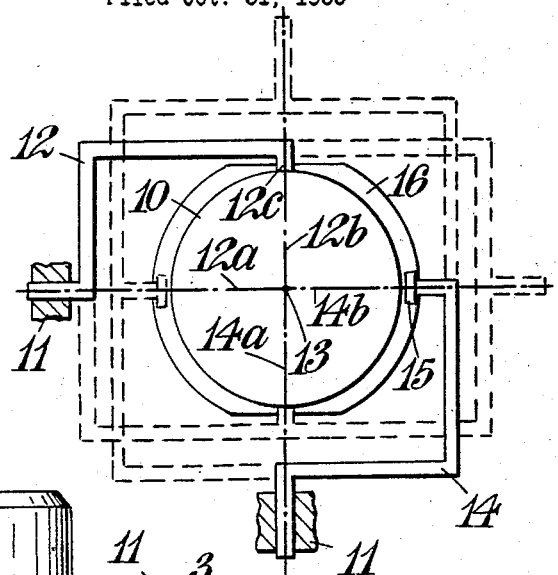
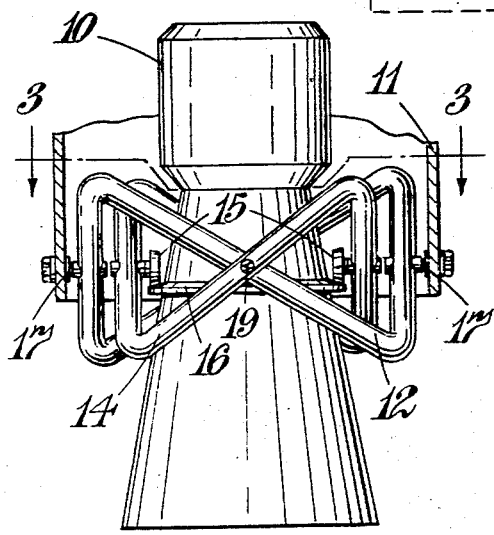
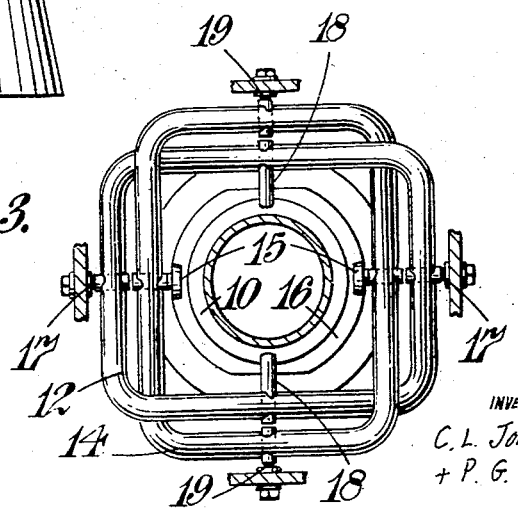

2,950,133

MOUNTINGS, COUPLINGS AND THE LIKE DEVICES

Christopher Linley Johnson, Allestree, and Philip Gordon Binns, Littleover, England, assignors to Rolls-Royce Limited, Derby, England, a corporation of Great Britain Filed Oct. 31, 1955, Ser. No. 543,645

Claims priority, application Great Britain Nov. 1, 1954

8 Claims. (Cl. 287—1)

This invention relates to mountings, couplings and the like devices of the kind by means of which two parts may be interconnected with freedom for relative angular movement. For convenience such a mounting, coupling or like device will be referred to as a universal connection.

The invention has for an object to provide an improved construction of universal connection whereby the load-transmitting characteristics may be improved.

According to the present invention, a universal connection comprises a pair of connecting members pivoted to one of the parts to swing each about a corresponding axis, which axes intersect at a centre and are mutually at right angles, and each of said connecting members engages the other part in a manner to permit angular freedom between the connecting member and said other part about an axis which passes through said centre and is at right angles to the corresponding axis about which the connecting member is pivoted to the said one of the parts, the engagement between at least one of the connecting members and said other part being a rolling engagement.

Preferably, each of said connecting members is in the form of a frame pivoted to the one part at diametrically opposite points along the corresponding axis on each side of said centre of intersection, and also having its engagement with the second part at diametrically opposite points along the corresponding axis of angular freedom on each side of the centre of intersection. In this way, a universal connection is obtained with four load-taking points on each of the parts.

Preferably, moreover, only one of the frames has a rolling engagement with the second part, and the rolling engagement may be through frusto-conical rollers which run on a frusto-conical track and have their apices at the centre.

The frames in the preferred arrangement will be suitably cranked to permit substantial angular displacement without interference.

One embodiment of this invention will now be described with reference to the accompanying drawings, in which—

Figure 1 is a diagrammatic representation of a universal mounting suitable for supporting a reaction propulsion engine in an aircraft structure, Figure 2 is an elevational view of the engine in the mounting, and Figure 3 is a section on the line 3—3 of Figure 2.

Referring to the drawings, the engine is indicated at 10 and the aircraft structure in which it is mounted, is indicated at 11.

Referring to Figure 1, the basic elements of the universal mounting are shown and the mounting comprises a first connecting member 12 which is pivoted about an axis 12a in the aircraft structure 11 and is pivoted at 12c to the engine 10 to swing about an axis 12b which is at right angles to axis 12a and intersects it at centre 13, and a second connecting member 14 which is pivoted about an axis 14a in the aircraft structure 11, the axis 14a passing through centre 13 and being at right angles to axis 12a, and which engages the engine 10 through a roller 15 running on a track 16, the roller axis 14b being at right angles to axis 14a and passing through the centre 13.

When the axes 12a and 14b are in line clearly the track 16 can tilt about them by swinging of member 12, and also when axes 12b, 14a are in line tilting of the track occurs about them by swinging of the member 14. Any other swinging movement of the engine axis about centre 13 will result in swinging of both members 12, 14 and in this movement the roller 15 will run on the track 16 to approach or move away from the pivot 12c.

In Figures 2 and 3, the mounting is shown as comprising two full frame members, the member 12 having two points 17 of pivotal connection to the aircraft structure 11 and two 18 to the engine 10, whilst the member 14 has two points of connection 19 to the aircraft structure 11 and two frusto-conical rollers 15 on a frusto-conical track 16. Each pair of pivots is symmetrical about the centre 13 and the rollers 15 are also symmetrically disposed.

From Figure 2 it will be seen that the frame members are cranked to allow them a substantial degree of relative swing without interference.

It will be seen that with this arrangement four load-taking points are provided on both the aircraft structure and engine, as compared with the two such points of a normal gimbal mounting. Also the position of the engine can be controlled by two jacks both fixed to the aircraft structure.

We claim:

1. A universal connection for joining a first part to a second part comprising first and second connecting members, the connecting members being pivoted to the first part to swing about first and second axes respectively, the axes intersecting at a centre and being at right angles to one another, the first connecting member engaging the second part in a manner to permit angular freedom between the first connecting member and said second part about a third axis which passes through said centre and is at right angles to the first axis about which the one connecting member is pivoted to the said one part, rollers carried by the second connecting member and rotatable about a fourth axis which passes through the center and is at right angles to the second axis, and an annular track on the second part co-operating with the rollers.

2. A universal connection as claimed in claim 1, wherein each of said first and second connecting members comprises a frame pivoted to the first part at diametrically opposite points respectively along the first and second axes on each side of said centre of intersection, the first connecting member also engages with the second part at diametrically opposite points along the third axis of angular freedom on each side of the centre of intersection, and the rollers are carried on the second connecting member at diametrically opposite points along the fourth axis one on each side of the center.

3. A universal connection as claimed in claim 2, wherein the rollers are frusto-conical rollers and the track is a frusto-conical track, the rollers and track having their apices at the centre.

4. A universal connection as claimed in claim 2, wherein the frames are cranked to permit substantial angular displacement without interference.

5. A universal coupling joining a first part to a second part and permitting universal movement therebetween comprising a pair of connecting members, one connecting member being pivoted to the first part to swing about a first axis and being pivoted to the second part to swing about a second axis intersecting the first axis at a center and at right angles to the first axis, the second connecting member being pivoted to the first part to swing about a third axis passing through said center at right angles to said first axis, load-taking means mounted on said second connecting member at a position which is on a fourth axis passing through the center at right angles to the third axis and which is offset from the center, and an annular track on the second part contained substantially in a plane parallel to the plane of the third and fourth axes and co-operating with the load-taking means.

6. A universal coupling as claimed in claim 5, wherein the frames are cranked to permit substantial angular displacement without interference.

7. A universal coupling according to claim 5, wherein connecitng members are frames encircling one of the parts, the first connecting member is pivoted to the first part through a first pair of pivots disposed one on each side of the center along the first axis and is pivoted to the second part by a second pair of pivots disposed one on each side of the center along the second axis, the second connecting member is pivoted to the first part through a third pair of pivots disposed one on each side of the center along the third axis, and the load-taking means comprises a pair of rollers rotatively mounted on the second connecting member one on each side of the center along the fourth axis at equal distances from the center and running on the annular track at diametrically opposite points.

8. A universal coupling according to claim 7, wherein the rollers are frusto-conical and have their apices at the center and the track has a complementary frusto-conical form.

References Cited in the file of this patent

UNITED STATES PATENTS

| | | |
|---|---|---|
| 1,735,058 | Schuler | Nov. 12, 1929 |
| 2,077,398 | Clark | Apr. 20, 1937 |
| 2,133,809 | Carter et al. | Oct. 18, 1938 |
| 2,639,582 | Pearlman | May 26, 1953 |